United States Patent
Nakata et al.

(10) Patent No.: US 9,864,115 B2
(45) Date of Patent: Jan. 9, 2018

(54) POLARIZING PLATE AND METHOD FOR MANUFACTURING POLARIZING PLATE

(71) Applicant: NITTO DENKO CORPORATION, Ibaraki-shi, Osaka (JP)

(72) Inventors: Mie Nakata, Ibaraki (JP); Shunsuke Murayama, Ibaraki (JP); Tomohiro Yamashita, Ibaraki (JP); Makiko Kimura, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 6 days.

(21) Appl. No.: 14/992,348

(22) Filed: Jan. 11, 2016

(65) Prior Publication Data

US 2016/0216421 A1 Jul. 28, 2016

(30) Foreign Application Priority Data

Jan. 27, 2015 (JP) ................. 2015-013005

(51) Int. Cl.
*G02B 5/20* (2006.01)
*G02B 1/14* (2015.01)
*G02B 5/30* (2006.01)
*G02B 1/04* (2006.01)

(52) U.S. Cl.
CPC ............... *G02B 5/208* (2013.01); *G02B 1/14* (2015.01); *G02B 5/3025* (2013.01); *G02B 1/04* (2013.01)

(58) Field of Classification Search
CPC . G02B 5/20; G02B 5/208; G02B 5/22; G02B 5/30–5/3058; G02B 5/3083; G02B 1/04; G02B 1/08; G02B 1/105; G02B 1/14; G02B 27/28–27/288; H01L 51/5281; H01L 51/5293; G02F 1/0136; G02F 1/133528; G02F 1/133533; G02F 1/13362; G02F 2001/133541–2001/13355

See application file for complete search history.

(56) References Cited

U.S. PATENT DOCUMENTS

| 7,045,216 | B2 * | 5/2006 | Ishii ....................... G02B 1/105 428/424.2 |
| 2009/0027596 | A1 * | 1/2009 | Toyama ............... G02B 5/3083 349/75 |
| 2010/0220392 | A1 * | 9/2010 | Tomoguchi ............ G02B 1/105 359/485.01 |
| 2014/0045995 | A1 * | 2/2014 | Shimamoto ............... C08F 8/32 525/78 |

FOREIGN PATENT DOCUMENTS

JP 5337467 B2 11/2013

* cited by examiner

*Primary Examiner* — Stephone B Allen
*Assistant Examiner* — Adam W Booher
(74) *Attorney, Agent, or Firm* — Westerman, Hattori, Daniels & Adrian, LLP

(57) ABSTRACT

It is an object of the present invention to provide a polarizing plate which can suppress display unevenness even when being incorporated into a liquid crystal display device, has neutral hue, and can maintain cross property even when a low water-vapor permeable protective film is used. It is another object of the present invention to provide a method for manufacturing the same. The polarizing plate includes: a polarizing film; an adhesive layer; and a protective film provided on at least one surface of the polarizing film with the adhesive layer interposed therebetween. A ratio ($I_{285}/I_{480}$) of absorbance $I_{285}$ of the polarizing film at 285 nm to absorbance $I_{480}$ thereof at 480 nm is 1.2 or less. The polarizing plate has a hue b value of 4 or less. The protective film has a water-vapor permeability of 100 g/m²·day or less.

10 Claims, No Drawings

POLARIZING PLATE AND METHOD FOR MANUFACTURING POLARIZING PLATE

BACKGROUND OF THE INVENTION

Field of the Invention

The present invention relates to a polarizing plate and a method for manufacturing the polarizing plate.

Description of the Related Art

As a polarizing plate used for a liquid crystal display device or the like, a polarizing film including protective films bonded to both surfaces thereof is generally used. Examples of the polarizing film include a polarizing film obtained by adsorbing a dichroic material such as iodine or a dichroic dye to a polyvinyl alcohol-based film and further orienting the film by stretching. Examples of the protective film include a triacetyl cellulose film. A polyvinyl alcohol-based adhesive or the like is used to bond the protective film to the polarizing film.

The liquid crystal display device is often used for a long period of time under a high temperature condition or the like because of the wide usage of the liquid crystal display device. For example, the liquid crystal display device is often used for vehicle installation and a handheld terminal. As a result, the polarizing plate is also required to have reliability (durability) such that the polarizing plate suffers from no deterioration in optical property when the polarizing plate is placed under a high temperature condition or high temperature/high humidity conditions.

However, since the triacetyl cellulose film used for the protective film is water-vapor permeable (has a high water-vapor permeability), the optical property of the polarizing film and the adhesion property of an adhesive are deteriorated by the absorption of moisture, which may cause display unevenness. As a countermeasure for this problem, a technique is proposed, in which an adhesive layer for bonding a protective film to a polarizing film is dried at 40 to 70° C., and a ratio of absorbance of the polarizing film at 296 nm to absorbance thereof at 480 nm is set at 1.65 or less to improve durability in a humidified environment (for example, see Patent Document 1).

PRIOR ART DOCUMENT

Patent Document

Patent Document 1: Japanese Patent Publication No. 5337467

SUMMARY OF THE INVENTION

In recent years, there is an increasing demand for a polarizing plate having neutral hue without having yellowish color and bluish color for the purpose of suppressing coloring during the white display of the liquid crystal display device or the like and of securing the likelihood of design of a color filter during panel design. The technique of Patent Document 1 can suppress a change in hue itself, but does not suggest that the polarizing plate has neutral hue.

In addition, if the adhesive layer is dried at a comparatively low temperature when the polarizing plate is produced using the protective film having a low water-vapor permeability as in Patent Document 1, the drying is insufficient, and the moisture absorbing state of the polarizing film continues. As a result, this may make it difficult to maintain the cross property (cross transmittance) of the polarizing plate.

The present invention has been made in view of the above problems, and it is an object of the present invention to provide a polarizing plate which can suppress display unevenness even when being incorporated into a liquid crystal display device, has neutral hue, and can maintain cross property even when a low water-vapor permeable protective film is used. It is another object of the present invention to provide a method for manufacturing the same.

As a result of earnest studies to solve the problems, the present inventors focused on the necessity of decreasing a hue b value correlating with the yellowish color of a polarizing plate in order to provide the neutral hue of the polarizing plate. As a result of further studies, it became clear that the neutral hue is provided when the generation of non-aligned (free) iodine complex $I_3^-$ of polyiodine complexes formed in a polarizing film is suppressed. As a result of studies based on these findings, the present inventors found a polarizing plate to be described below, and the present invention was accomplished.

That is, the present invention relates to a polarizing plate including: a polarizing film; an adhesive layer; and a protective film provided on at least one surface of the polarizing film with the adhesive layer interposed therebetween. A ratio ($I_{285}/I_{480}$) of absorbance $I_{285}$ of the polarizing film at 285 nm to absorbance $I_{480}$ thereof at 480 nm (hereinafter, also simply referred to as an "absorbance ratio") is 1.2 or less. The polarizing plate has a hue b value of 4 or less. The protective film has a water-vapor permeability of 100 g/m$^2$·day or less.

According to the present inventors' studies, it became clear that the non-aligned iodine complex $I_3^-$ is present near 285 nm. Since the absorbance ratio of the polarizing film is 1.2 or less in the polarizing plate, the generation of the non-aligned iodine complex $I_3^-$ is suppressed, which can provide the neutral hue of the polarizing plate. When the absorbance ratio is more than 1.2, the relative amount of the non-aligned iodine complex $I_3^-$ is excessive, to provide the polarizing plate having yellowish color, which tends to cause deterioration in neutral property.

Since the absorbance ratio is 1.2 or less in the polarizing plate, the hue b value can be suitably set to 4 or less. Thereby, the neutral property of hue can be efficiently achieved, which can prevent coloring during white display, and secure likelihood of design during panel design.

Furthermore, since the water-vapor permeability of the protective film disposed on at least one surface of the polarizing film is set to 100 g/m$^2$·day or less in the polarizing plate, the display unevenness of the panel caused by moisture absorption can be suppressed.

The absorbance ratio is preferably more than 1.0 and 1.2 or less in the polarizing film. By setting the absorbance ratio of the polarizing film to be more than 1.0, the cross property (cross transmittance) of the polarizing plate can be suitably maintained. When the absorbance ratio is 1.0 or less, the cross transmittance tends to be increased to cause bluish color.

The adhesive layer preferably contains a water-based adhesive. Since the water-based adhesive has high tackiness with a polyvinyl alcohol-based polarizing film, the water-based adhesive can prevent the peeling off of the polarizing film.

The protective film preferably contains a (meth)acrylic resin which has an unsaturated carboxylic acid alkyl ester unit and a glutarimide unit represented by the general formula (1), has an imidization ratio of 2.5 to 5.0% and an acid value of 0.10 to 0.50 mmol/g, and contains less than 1% by weight of an acrylic ester unit:

[Formula 1]

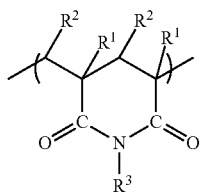

(1)

wherein:

R¹ and R² each independently represent hydrogen or an alkyl group having 1 to 8 carbon atoms; and R³ represents an alkyl group having 1 to 18 carbon atoms, a cycloalkyl group having 3 to 12 carbon atoms, or an aryl group having 6 to 10 carbon atoms.

The protective film contains the specific (meth)acrylic resin which has the glutarimide unit represented by the general formula (1). This can provide an improvement in the moisture resistance and heat resistance of the polarizing plate, and thereby the warpage of the polarizing plate can be prevented under high temperature/high humidity conditions.

The protective film preferably contains an ultraviolet-ray absorber. When a liquid crystal display device or the like including the polarizing plate is used in a field environment for a long period of time, ultraviolet rays may cause the yellow discoloration of the panel. The yellow discoloration of the panel can be suitably prevented by employing the protective film containing the ultraviolet-ray absorber.

The present invention also includes a method for manufacturing a polarizing plate, the polarizing plate including a polarizing film and a protective film provided on at least one surface of the polarizing film, the method including the steps of:

forming an adhesive layer on at least one of the polarizing film and the protective film;

bonding the protective film to at least one surface of the polarizing film with the adhesive layer interposed therebetween; and heating the polarizing plate including the protective film and the polarizing film bonded together, in a temperature range where a maximum temperature is 85° C. or higher, to dry the polarizing plate, wherein:

a ratio ($I_{285}/I_{480}$) of absorbance $I_{285}$ of the polarizing film at 285 nm to absorbance $I_{480}$ thereof at 480 nm is 1.2 or less; and the protective film has a water-vapor permeability of 100 g/m·day or less.

Since the maximum temperature in the drying step of the polarizing plate is 85° C. or higher in the manufacturing method, the polarizing plate, particularly the adhesive layer can be sufficiently dried even when the protective film having a water-vapor permeability of 100 g/m²·day or less is bonded thereto. Thereby, deterioration in the cross property of the polarizing plate can be prevented.

The absorbance, the water-vapor permeability, the hue b value, and the other properties are measured based on the description of Examples.

DETAILED DESCRIPTION OF THE PREFERRED EMBODIMENTS

<Polarizing Plate>

A polarizing plate according to the present embodiment will be described. The polarizing plate according to the present embodiment has a structure in which a protective film is bonded to at least one surface of a polarizing film with an adhesive layer interposed therebetween.

(Polarizing Film)

It is preferable to use, as the polarizing film, a polarizing film including a polymer film on which iodine is adsorbed and oriented. The polymer film is not particularly limited, and various polymer films can be used. Examples of the polymer film include: hydrophilic polymer films such as a polyvinyl alcohol-based film, a polyethylene terephthalate-based film, an ethylene-vinyl acetate copolymer-based film, partially saponified films thereof, and a cellulose-based film; and polyene-based oriented films such as a dehydrated material of polyvinyl alcohol and a dehydrochlorinated material of polyvinyl chloride. Among these, a polyvinyl alcohol-based film having excellent stainability provided by iodine is preferably used as the polarizing film.

Polyvinyl alcohol or a derivative thereof is used as a material of the polyvinyl alcohol-based film. Examples of the derivative of polyvinyl alcohol include polyvinyl formal and polyvinyl acetal as well as polyvinyl alcohol modified with an olefin such as ethylene or propylene, an unsaturated carboxylic acid such as acrylic acid, methacrylic acid, or crotonic acid, an alkyl ester thereof, or acryl amide.

The degree of polymerization of a polymer which is a material of the polymer film is generally 500 to 10,000, preferably 1,000 to 6,000, and more preferably 1,400 to 4,000. Furthermore, from the viewpoint of the solubility of a polymer, which is a material of a saponified film, in water, for example, the degree of saponification of the saponified film is preferably 75% by mole or more, more preferably 98% by mole or more, and still more preferably in the range of 98.3 to 99.8% by mole.

When the polyvinyl alcohol-based film is used as the polymer film, there can be appropriately used a polyvinyl alcohol-based film formed by any method such as a flow casting method for subjecting an undiluted solution dissolved in water or an organic solvent to flow casting to form a film, a casting method, or an extrusion method as a method for producing the polyvinyl alcohol-based film. A polyvinyl alcohol-based film having a retardation value of 5 nm to 100 nm is preferably used. In order to obtain a polarizing film formed uniformly in plane, variation in the in-plane retardation of the polyvinyl alcohol-based film is preferably as small as possible. Variation in the in-plane retardation of the PVA-based film as an original fabric film is, at a measurement wavelength of 1000 nm, preferably 10 nm or less, and more preferably 5 nm or less.

The single transmittance of the polarizing film in a wavelength range of 380 nm to 780 nm is preferably 44.5% or less, and more preferably 42 to 44%. When the single transmittance is more than 44.5%, the cross transmittance is increased to cause light leakage in black display, which is not preferable. When the polarizing plate according to the present embodiment is applied to a liquid crystal display device, the display contrast of a display screen can be further improved.

The polymer film (unstretched film) is subjected to at least a uniaxial stretching treatment and an iodine dyeing treatment according to conventional methods. The polymer film may further be subjected to a boric acid treatment or a cleaning treatment. The polymer film (stretched film) subjected to the treatment described above becomes a polarizing film through drying according to a conventional method.

The stretching method in the uniaxial stretching treatment is not particularly limited, and either of a wet stretching method and a dry stretching method may be employed. Examples of a stretching means for the dry stretching method include a roll stretching method, a heating roll stretching method, and a compression stretching method. The stretching may be performed in a plurality of steps. In the stretching means, the unstretched film is generally in a heated state. The stretching ratio of the stretched film may be appropriately set according to the purpose. However, it is desirable that the stretching ratio (total stretching ratio) is about 2 to 8 times, preferably 3 to 6.5 times, and more preferably 3.5 to 6 times.

The iodine dyeing treatment is performed by immersing the polymer film in an iodine solution containing iodine and potassium iodide, for example. The iodine solution is generally an aqueous iodine solution, and contains iodine and potassium iodide as a dissolution aid. The concentration of iodine about 0.01 to 1% by weight, and preferably 0.02 to 0.5% by weight. The concentration of potassium iodide is preferably about 0.01 to 10% by weight, and more preferably 0.02 to 8% by weight.

In the iodine dyeing treatment, the temperature of the iodine solution is generally about 20 to 50° C., and preferably 25 to 40° C. A time period of immersion is generally about 10 to 300 seconds, and preferably 20 to 240 seconds. In the iodine dyeing treatment, through adjustment of conditions such as the concentration of the iodine solution, and the temperature and time period of the immersion of the polymer film in the iodine solution, an iodine content and a potassium content in the polymer film are adjusted to be within the above range. The iodine dyeing treatment may be performed at any of the time points including before the uniaxial stretching treatment, during the uniaxial stretching treatment, and after the uniaxial stretching treatment.

The iodine content of the polarizing film is, for example, 2 to 5% by weight, and preferably 2 to 4% by weight in view of optical property.

The polarizing film preferably contains potassium. The potassium content is preferably 0.2 to 0.9% by weight, and more preferably 0.5 to 0.8% by weight. When the polarizing film contains potassium, the polarizing film having a preferable composite elastic modulus (Er) and a high degree of polarization can be obtained. The incorporation of potassium is enabled by immersing a polymer film which is a formation material of the polarizing film in a solution containing potassium, for example. The solution may also serve as a solution containing iodine.

The thickness of the polarizing film is not particularly limited, and generally 5 to 30 μm, preferably 8 to 30 μm, and more preferably 10 to 30 μm.

A ratio ($I_{285}/I_{480}$) of absorbance $I_{285}$ of the polarizing film at 285 nm to absorbance $I_{480}$ thereof at 480 nm is required to be 1.2 or less, preferably more than 1.0 and 1.2 or less, and more preferably 1.01 or more and 1.19 or less. Since the absorbance ratio of the polarizing film is 1.2 or less, the generation of non-aligned iodine complex $I_3^-$ is suppressed, which can provide the neutral hue of the polarizing plate. When the absorbance ratio is more than 1.2, the relative amount of the non-aligned iodine complex $I_3^-$ is excessive, and the polarizing plate has yellowish color, which tends to cause deterioration in neutral property. In contrast, when the absorbance ratio of the polarizing film is more than 1.0, the cross property (cross transmittance) of the polarizing plate can be suitably maintained. When the absorbance ratio is 1.0 or less, the cross transmittance is increased, which tends to cause bluish color. The absorbance ratio can be adjusted by controlling the iodine content, the stretching degree of the film, the drying temperature of the polarizing plate, or the like.

(Protective Film)

The protective film has transparency to light. Thermoplastic resins having excellent transparency, mechanical strength, thermal stability, moisture interception property, isotropy and the like are used as materials which form the protective film. Specific examples of the thermoplastic resins include cellulose resins such as triacetylcellulose, a polyester resin, a polyethersulfone resin, a polysulfone resin, polycarbonate resin, a polyimide resin, a polyimide resin, a polyolefin resin, a (meth)acrylic resin, a cyclic polyolefin resin (norbornene resin), a polyarylate resin, a polystyrene resin, a polyvinyl alcohol resin, and mixtures thereof. The protective film is bonded to one side of the polarizing film with an adhesive layer. Meanwhile, a thermosetting resin or an ultraviolet-ray curing-type resin such as a (meth)acrylic, urethane, acrylic urethane, epoxy, or silicone resin as the protective film may be used on the other side of the polarizing film. The content of the thermoplastic resin in the protective film is preferably 50 to 100% by weight, more preferably 50 to 99% by weight, still more preferably 60 to 98% by weight, and particularly preferably 70 to 97% by weight. When the content of the thermoplastic resin in the protective film is less than 50% by weight, high transparency or the like inherently provided in the thermoplastic resin may fail to be sufficiently exhibited.

Examples of the protective film include a polymer film described in JP-A-2001-343529 (WO 01/37007). The polymer film is made of a resin composition containing (A) a thermoplastic resin having a substituted and/or unsubstituted imido group in a side chain, and (B) a thermoplastic resin having substituted and/or unsubstituted phenyl and nitrile groups in a side chain. Specific examples include a film made of a resin composition containing an alternating copolymer made of isobutylene and N-methyl maleimide, and an acrylonitrile-styrene copolymer. A film made of an extruded article of a mixture of a resin composition or the like may be used. Since the films are smaller in retardation and smaller in photoelastic coefficient, defects such as unevenness due to a strain in the polarizing plate can be eliminated. Since the films are smaller in the water-vapor permeability, the films have excellent durability in a humidified environment.

The thickness of the protective film can be appropriately set, and is generally about 1 to 500 μm from the viewpoint of strength, workability such as handleability, requirement for a thin film or the like. Particularly, the thickness is preferably 1 to 300 μm, and more preferably 5 to 200 μm. When the thickness is 5 to 150 μm, the protective film is particularly suitable.

The water-vapor permeability of the protective film provided on at least one surface of the polarizing film is required to be 100 g/m²·day or less, preferably 1 to 100 g/m²·day, and more preferably 1 to 80 g/m² g/m²·day. By setting the water-vapor permeability to the above range, a change in the hue of the polarizing plate caused by moisture is suppressed, and a decrease in the degree of polarization is prevented, which can suppress display unevenness. The water-vapor permeability is the number of grams of water vapor that passes through a sample having an area of 1 m² in a relative humidity difference of 90% at 40° C. in 24 hours according to the water-vapor permeability test (cup method) of JIS Z0208.

When the protective film is provided on each of both surfaces of the polarizing film, a polymer material contained in the protective film provided on the front surface may be the same as, or different from a polymer material contained in the protective film provided on the back surface.

At least one selected from a polycarbonate resin, a cyclic polyolefin resin, and a (meth)acrylic resin is preferably used as the protective film having the water-vapor permeability in the above range of the present embodiment. A cellulose resin or the like is preferably used as the protective film provided on the other surface of the polarizing film.

Specifically, preferable examples of the cyclic polyolefin resin include a norbornene resin. The cyclic olefin resin is a generic name of resins produced by polymerization of a cyclic olefin used as a polymerizable unit. Examples thereof include resins described in JP-A-01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modifying these with unsaturated carboxylic acids or derivatives thereof, and hydrides thereof. Specific examples of the cyclic olefin include norbornene monomers.

Various products are commercially available as the cyclic polyolefin resin. Specific examples thereof include Zeonex (trade name) and Zeonor (trade name) manufactured by Zeon Corporation, Arton (trade name) manufactured by JSR Corporation, Topas (trade name) manufactured by Ticona, and Apel (trade name) manufactured by Mitsui Chemicals, Inc.

Any suitable (meth)acrylic resin may be employed as long as the advantages of the present invention are not reduced. Examples of the (meth)acrylic resin include poly(meth)acrylates such as poly(methyl methacrylate), a methyl methacrylate-(meth)acrylic acid copolymer, a methyl methacrylate-(meth)acrylate copolymer, a methyl methacrylate-acrylate-(meth)acrylic acid copolymer, a methyl(meth)acrylate-styrene copolymer (such as an MS resin), and alicyclic hydrocarbon group-containing polymers (such as a methyl methacrylate-cyclohexyl methacrylate copolymer and a methyl methacrylate-norbornyl(meth)acrylate copolymer). Preferable examples include poly(C1-6 alkyl(meth)acrylate)s such as poly(methyl(meth)acrylate). More preferable examples include a methyl methacrylate-based resin mainly containing methyl methacrylate (of 50 to 100% by weight, preferably 70 to 100% by weight).

Specific examples of the (meth)acrylic resin include Acrypet VH and Acrypet VRL20A each manufactured by Mitsubishi Rayon Co., Ltd., a (meth)acrylic resin having a ring structure in its molecule as described in JP-A-2004-70296, and a high-Tg (meth)acrylic resin produced by an intramolecular crosslinking or intramolecular cyclization reaction.

Lactone ring structure-containing (meth)acrylic resins can also be used as the (meth)acrylic resin. This is because the (meth)acrylic resins have high heat resistance and high transparency, and also have high mechanical strength after biaxially stretched.

Examples of the lactone ring structure-containing (meth)acrylic resins include lactone ring structure-containing (meth)acrylic reins described in JP-A-2000-230016, 2001-151814, 2002-120326, 2002-254544, 2005-146084 or the like.

The protective film preferably contains a (meth)acrylic resin having an unsaturated carboxylic acid alkyl ester unit and a glutarimide unit. The (meth)acrylic resin preferably has a structure unit including a glutarimide unit represented by the following general formula (1) and an unsaturated carboxylic acid alkyl ester unit represented by the following general formula (2).

[Formula 2]

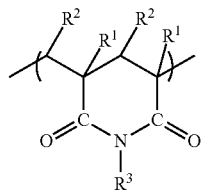

(1)

In the general formula (1), $R^1$ and $R^2$ each independently represent hydrogen or an alkyl group having 1 to 8 carbon atoms, and $R^3$ represents an alkyl group having 1 to 18 carbon atoms, a cycloalkyl group having 3 to 12 carbon atoms, or an aryl group having 6 to 10 carbon atoms.

[Formula 3]

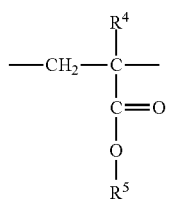

(2)

In the general formula (2), $R^4$ represents a hydrogen atom or an alkyl group having 1 to 5 carbon atoms. $R^5$ represents a hydrogen atom, or an aliphatic or alicyclic hydrocarbon group having 1 to 6 carbon atoms.

In the general formula (1), it is preferable that $R^1$ and $R^2$ each independently represent hydrogen or a methyl group, and $R^3$ is hydrogen, a methyl group, a butyl group, or a cyclohexyl group. It is more preferable that $R^1$ is a methyl group, $R^2$ is hydrogen, and $R^3$ is a methyl group.

The glutar(meth)acrylic resin may contain only a single glutarimide unit, or may contain a plurality of glutarimide units in which $R^1$, $R^2$, and $R^3$ in the general formula (1) are different.

The content by percentage of the glutarimide unit represented by the general formula (1) in the (meth)acrylic resin is preferably 5 to 50% by mole, more preferably 10 to 45% by mole, still more preferably 15 to 40% by mole, particularly preferably 20 to 35% by mole, and most preferably 25 to 35% by mole. When the content by percentage is less than 5% by mole, effects derived from the glutaric anhydride unit represented by the general formula (1), such as high optical property, high mechanical strength, adhesiveness with a polarizer, and a reduction in thickness may not be sufficiently exhibited. When the content by percentage is more than 50% by mole, for example, high heat resistance and high transparency may not be sufficiently exhibited.

The content by percentage of the unsaturated carboxylic acid alkyl ester unit represented by the general formula (2) in the (meth)acrylic resin is preferably 50 to 95% by mole, more preferably 55 to 90% by mole, still more preferably 60 to 85% by mole, particularly preferably 65 to 80% by mole, and most preferably 65 to 75% by mole. When the content by percentage is less than 50% by mole, effects derived from the unsaturated carboxylic acid alkyl ester unit represented by the general formula (2), such as high heat resistance and high transparency may not be sufficiently exhibited. When the content by percentage is more than 95% by mole, the resin is brittle so as to be easily cracked so that the resin cannot sufficiently exhibit high mechanical strength. Thus, the resin may be poor in productivity.

The (meth)acrylic resin having a glutarimide unit represented by the general formula (1) and an unsaturated carboxylic acid alkyl ester unit represented by the general formula (2) can be basically manufactured by the following method.

That is, the (meth)acrylic resin can be obtained by copolymerizing an unsaturated carboxylic acid alkyl ester monomer corresponding to the unsaturated carboxylic acid alkyl ester unit represented by the general formula (2) with an unsaturated carboxylic acid monomer and/or a precursor monomer thereof to obtain a copolymer (a), treating the copolymer (a) with an imidization agent to conduct an intramolecular imidization reaction between the unsaturated carboxylic acid alkyl ester monomer unit in the copolymer (a) and the unsaturated carboxylic acid monomer and/or the precursor monomer unit thereof, and then introducing the glutarimide unit represented by the general formula (1) into the copolymer.

Examples of the unsaturated carboxylic acid alkyl ester include methyl(meth)acrylate, ethyl(meth)acrylate, n-propyl (meth)acrylate, n-butyl(meth)acrylate, t-butyl(meth)acrylate, n-hexyl(meth)acrylate, cyclohexyl(meth)acrylate, chloromethyl(meth)acrylate, 2-chloroethyl(meth)acrylate, 2-hydroxyethyl(meth)acrylate, 3-hydroxypropyl(meth)acrylate, 2,3,4,5,6-pentahydroxyhexyl(meth)acrylate, and 2,3,4,5-tetrahydroxypentyl(meth)acrylate. These may be used alone or in combination of two or more thereof. Of these, methyl(meth)acrylate is more preferable and methyl methacrylate is particularly preferable since the compounds are excellent in thermal stability. That is, it is particularly preferable that in the general formula (1), $R^4$ is a methyl group and $R^5$ is a methyl group.

Examples of the unsaturated carboxylic acid monomer include acrylic acid, methacrylic acid, crotonic acid, α-substituted acrylic acid, and α-substituted methacrylic acid. Examples of the precursor monomer thereof include acryl amide and methacryl amide. The unsaturated carboxylic acid monomer or the precursor monomer thereof may be used alone or in combination of two or more thereof. Of these, it is particularly preferable that the unsaturated carboxylic acid monomer is acrylic acid and methacrylic acid, and the precursor monomer is acryl amide since the compounds cause the effects of the present invention to be sufficiently exhibited.

The method for treating the copolymer (a) with the imidization agent is not particularly limited, and any conventionally known methods can be used. For example, the copolymer (a) can be imidized by a method using an extruder, a batch type reaction vessel (pressure vessel) or the like. When the copolymer (a) is heat-melted using the extruder and treated with the imidization agent, the extruder to be used is not particularly limited, and various extruders can be used. Specifically, a single-screw extruder, a twin-screw extruder, a multi-screw extruder or the like can be used, for example. When the copolymer (a) is treated with the imidization agent using the batch type reaction vessel (pressure vessel), the structure of the batch type reaction vessel (pressure vessel) is not particularly limited.

The imidization agent is not particularly limited as long as the agent can generate the glutarimide unit represented by the general formula (1). Specific examples thereof include: aliphatic hydrocarbon group-containing amines such as methylamine, ethylamine, n-propylamine, i-propylamine, n-butylamine, i-butylamine, tert-butylamine, and n-hexylamine; aromatic hydrocarbon group-containing amines such as aniline, benzylamine, toluidine, and trichloroaniline; and alicyclic hydrocarbon group-containing amines such as cyclohexylamine.

It is also possible to use a urea compound, which generates the amines mentioned above upon being heated, such as urea, 1,3-dimethyl urea, 1,3-diethyl urea, and 1,3-dipropyl urea.

Among the imidization agents mentioned above, it is preferable to use methylamine, ammonia, and cyclohexylamine in view of the cost and physical properties, and it is particularly preferable to use methylamine.

In the imidization step, a ring-closing accelerator may be added if needed in addition to the imidization agent.

In the imidization step, the amount of the imidization agent is preferably 0.5 to 10 parts by weight, and more preferably 0.5 to 6 parts by weight based on 100 parts by weight of the copolymer (a). When the imidization agent is added in an amount of less than 0.5 part by weight, the imidization ratio of a resin composition to be finally obtained is decreased, which may cause remarkable deterioration in heat resistance thereof to induce appearance defects such as burnt deposit after the resin composition is molded. When the imidization agent is added in an amount of more than 10 parts by weight, the imidization agent remains in the resin, which may induce appearance defects such as burnt deposit after the resin composition is molded, and foaming.

The (meth)acrylic resin of the present embodiment contains the glutarimide unit represented by the general formula (1) and the unsaturated carboxylic acid alkyl ester unit, and has a specific imidization ratio, a specific acid value, and a specific acrylic ester unit content.

The imidization ratio in the (meth)acrylic resin is represented by the ratio between the glutarimide unit and the unsaturated carboxylic acid alkyl ester unit. Therefore, the "imidization ratio" refers to the proportion of the imide carbonyl groups in the whole carbonyl groups. The ratio can be measured by the NMR spectrum or IR spectrum of the (meth)acrylic resin, or other methods, for example. The imidization ratio in the present embodiment is obtained by subjecting a resin to $^1$H-NMR measurement using $^1$HNMR BRUKER AvanceIII (400 MHZ). When an area of a peak derived from the O—CH$_3$ proton of the unsaturated carboxylic acid alkyl ester near 3.5 to 3.8 ppm is defined as A, and an area of a peak derived from the N—CH$_3$ proton of glutarimide near 3.0 to 3.3 ppm is defined as B, the ratio is obtained according to the following formula.

$$Im\ \% = \{B/(A+B)\} \times 100$$

The imidization ratio is preferably 2.5 to 5.0%. An imidization ratio within the above range prevents deterioration in the heat resistance, transparency, molding processability, and mechanical strength of the (meth)acrylic resin to be obtained, and generation of burnt deposit when the (meth)acrylic resin is processed into the film. In contrast, an imidization ratio of less than 2.5% tends to cause burnt deposit when the protective film is formed, insufficient heat resistance of the (meth)acrylic resin to be obtained, and impaired transparency. An imidization ratio of more than 5.0% also tends to cause burnt deposit, unnecessarily high heat resistance and melt viscosity, deterioration in molding processability, extremely low mechanical strength during film processing, and impaired transparency.

The acid value of the (meth)acrylic resin of the present embodiment represents the content of a carboxylic acid unit or a carboxylic anhydride unit in the (meth)acrylic resin. The acid value can be calculated by, for example, a titration method described in WO 2005-054311, or a titration method described in JP-A-2005-23272.

The acid value of the (meth)acrylic resin is preferably 0.10 to 0.50 mmol/g. An acid value within the above range can provide a (meth)acrylic resin having an excellent balance of heat resistance, mechanical properties, and molding processability. In contrast, for example, an acid value of more than 0.50 mmol/g tends to easily cause foaming of a resin when the resin is melted and extruded, deterioration in molding processability, and deterioration in productivity of a molded article. An acid value of less than 0.10 mmol/g makes it necessary to use a larger amount of a denaturating agent for adjusting the acid value. This may cause cost increase or induce generation of a gel-like material due to the residual denaturating agent, which is not preferable.

The amount of the acrylic ester unit contained in the (meth)acrylic resin of the present embodiment is preferably less than 1% by weight, and more preferably less than 0.5% by weight. An acrylic ester unit within the above range provides a (meth)acrylic resin having excellent thermal stability. An amount of more than 1% by weight tends to cause deterioration in thermal stability, and a decrease in the molecular weight and viscosity of a resin when the resin is manufactured or molded, to cause deterioration in physical properties.

The cellulose resin which can form the protective film is an ester of cellulose and a fatty acid. Specific examples of the cellulose ester resin include triacetyl cellulose, diacetyl cellulose, tripropyl cellulose, and dipropyl cellulose. Among these, triacetyl cellulose is particularly preferable. Many triacetyl cellulose products are commercially available and are advantageous in view of easy availability and cost. Examples of commercially available products of triacetyl cellulose include "UV-50," "UV-80," "SH-80," "TD60UL," "TD80UL," "TD-TAC," and "UZ-TAC" (trade names) manufactured by Fujifilm Corporation, and "KC series" manufactured by Konica Minolta. In general, these triacetyl cellulose products have a thickness direction retardation (Rth) of about 60 nm or less, while having an in-plane retardation (Re) of almost zero.

A cellulose resin film having a small thickness direction retardation is obtained by treating the cellulose resin, for example. Examples of the treating method include: a method which includes bonding a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for about 3 to 10 minutes), and then peeling the base film; and a method which includes coating a general cellulose resin film with a solution of a norbornene resin, a (meth)acrylic resin or the like in a solvent such as cyclopentanone or methyl ethyl ketone, drying the coating film by heating (for example, at 80 to 150° C. for about 3 to 10 minutes), and then peeling the coating film.

A fatty acid cellulose resin film having a controlled degree of fat substitution may be used as the cellulose resin film having a small thickness direction retardation. While triacetyl cellulose for general use has a degree of acetic acid substitution of about 2.8, the degree of acetic acid substitution is preferably controlled to 1.8 to 2.7, and the degree of propion substitution is more preferably controlled to 0.1 to 1, so that the Rth can be reduced. The Rth may be controlled to be low by adding a plasticizer such as dibutyl phthalate, p-toluenesulfonanilide, or acetyl triethyl citrate, to the fatty acid-substituted cellulose resin. The plasticizer is preferably added in an amount of 40 parts by weight or less, more preferably of 1 to 20 parts by weight, and still more preferably of 1 to 15 parts by weight, based on 100 parts by weight of the fatty acid cellulose resin.

The protective film may contain at least one type of any suitable additives. Examples of the additive include an ultraviolet-ray absorber, an antioxidant, a lubricant, a plasticizer, a release agent, an anti-discoloration agent, a flame retardant, a nucleating agent, an antistatic agent, a pigment, and a colorant.

Among these, the protective film preferably contains an ultraviolet-ray absorber. The protective film including a specific structure unit, and having a specific imidization ratio, a specific acid value, and a specific acrylic ester unit content of the present embodiment can suppress the yellow discoloration of the polarizing plate while preventing burnt deposit caused by the ultraviolet-ray absorber during film forming. Specific examples of the ultraviolet-ray absorber include an oxybenzophenone compound, a benzotriazole compound, a salicylate ester compound, a benzophenone compound, a cyanoacrylate compound, a nickel complex salt compound, and a triazine compound that are conventionally known. Examples of methods for imparting the ultraviolet-ray absorber to the protective film include a method of adding an ultraviolet-ray absorber into the protective film and a method of laminating a layer containing an ultraviolet-ray absorber as a constituent layer of the protective film.

The content of the ultraviolet-ray absorber in the protective film may be appropriately adjusted so that the objective yellow discoloration preventing effect is obtained. When the content of the ultraviolet-ray absorber is too low, the yellow discoloration preventing effect may be insufficient. On the contrary, when the content of the ultraviolet-ray absorber is too high, the burnt deposit may be insufficiently suppressed or the ultraviolet-ray absorber may bleed out.

A protective film having a front retardation of less than 40 nm and a thickness direction retardation of less than 80 nm is generally used. The front retardation Re is represented by the formula Re=(nx−ny)×d. The thickness direction retardation Rth is represented by the formula Rth=(nx−nz)×d. The Nz coefficient is represented by the formula Nz=(nx−nz)/(nx−ny), where nx, ny and nz are respectively the refractive indices of the film in the directions of its slow axis, fast axis and thickness, and d is the thickness (nm) of the film. The direction of the slow axis is a direction in which the in-plane refractive index of the film is maximum. It is preferable that the protective film has as little coloring as possible. A protective film having a thickness direction retardation value of −90 nm to +75 nm is preferably used. Thus, coloring (optical coloring) of a polarizing plate resulting from a protective film can mostly be cancelled using the protective film having a thickness direction retardation value of −90 nm to +75 nm. The thickness direction retardation value (Rth) is more preferably −80 nm to +60 nm, and particularly preferably −70 nm to +45 nm.

In contrast, a retardation plate having at least one of a front retardation of 40 nm or more and a thickness direction retardation of 80 nm or more may be used as the protective film. The front retardation is generally controlled in the range of 40 to 200 nm, and the thickness direction retardation is generally controlled in the range of 80 to 300 nm. The retardation plate used as the protective film also has the function of the protective film, and can therefore achieve a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is not particularly limited, and is generally about 20 to 150 µm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallysulfone, polyamide, polyimide, polyolefin, polyvinyl chloride, a cellulose resin, a cyclic polyolefin resin (norbornene resin), and various types of binary or ternary copolymers thereof, graft copolymers thereof, and any blend thereof. These polymer materials are formed into an oriented product (a stretched film) by stretching or the like.

The retardation plate may be a retardation plate having an appropriate retardation in accordance with a use purpose such as a purpose of compensation for coloration based on the birefringence of various wavelength plates or liquid crystal layers or for the viewing angle. The retardation plate may be a laminate of two or more retardation plates to control optical properties such as a retardation.

The protective film may be subjected to a surface modification treatment before being coated with an adhesive. Specific examples thereof include a corona treatment, a plasma treatment, a primer treatment, and a saponification treatment. The surface of the protective film to which no polarizing film is bonded may be subjected to the formation of a hard coat layer, an anti-reflection treatment, an anti-stick treatment, or a treatment for diffusion or antiglare properties.

(Adhesive Layer)

The adhesive layer used to bond the protective film to the polarizing film is not particularly limited as long as the adhesive layer is optically transparent. The adhesive layer is of any type, such as a water-based adhesive layer, a solvent-based adhesive layer, a hot-melt adhesive layer, or a radical-curable adhesive layer. A water-based adhesive or a radical-curable adhesive is preferably used.

Examples of the water-based adhesive used to form the adhesive layer include, but are not particularly limited to, a vinyl polymer-based adhesive, a gelatin-based adhesive, a vinyl-based adhesive, a latex-based adhesive, a polyurethane-based adhesive, an isocyanate-based adhesive, a polyester-based adhesive, and an epoxy-based adhesive.

The adhesive layer is preferably formed so that the thickness of the adhesive after dried would be 0.01 to 20 µm, preferably 0.02 to 10 µm, and more preferably 0.5 to 5 µm. When the thickness of the adhesive layer is less than 0.01 µm, insufficient adhering strength is apt to cause peeling off. When the thickness of the adhesive layer is more than 20 µm, deterioration in the transparency thereof may be caused. In order to further increase the adhering strength of the adhesive, the protective film may be subjected to a surface treatment such as a corona treatment, a plasma treatment, or a flame treatment. The protective film may also be subjected to a treatment for providing an adhesion improving layer by primer processing.

(Other Elements)

A pressure-sensitive layer may be provided for adhesion with other members such as a liquid crystal cell on the polarizing plate described above or an optical film on which at least one polarizing plate is laminated. A pressure-sensitive adhesive which forms the pressure-sensitive layer is not particularly limited. For example, an acryl-based polymer; a silicone-based polymer; polyester, polyurethane, polyamide, polyether; and fluorine-based and rubber-based polymers may be appropriately selected as a base polymer. Particularly, a pressure-sensitive adhesive such as an acryl-based pressure-sensitive adhesive may be preferably used, which has excellent optical transparency, exhibits pressure-sensitive characteristics such as moderate wettability, cohesiveness and adhesive property, and has excellent weather resistance, heat resistance and the like.

The polarizing plate according to the present embodiment can be preferably used for various image display devices such as a liquid crystal display device. When the polarizing plate according to the present embodiment is applied to the liquid crystal display device, the polarizing plate is disposed so that an optical transmission axis is orthogonal to the front surface and back surface of the liquid crystal cell. Thereby, light leakage in a wavelength range of visible light is reduced, to obtain a liquid crystal display device preventing the generation of discoloration in a display screen. The liquid crystal cell is not particularly limited, and, for example, any type of liquid crystal cell such as a TN type, STN type, π type, VA type or IPS type liquid crystal cell can be applied.

<Method for Manufacturing Polarizing Plate>

A method for manufacturing a polarizing plate according to the present embodiment at least includes the steps of: forming an adhesive layer on at least one of a polarizing film and a protective film; bonding the protective film to at least one surface of the polarizing film with the adhesive layer interposed therebetween; and drying the polarizing plate including the protective film and the polarizing film bonded together, in a temperature range where a maximum temperature is 85° C. or higher.

The adhesive layer may be formed on the bonded surface of either one of the polarizing film and the protective film, or the bonded surfaces of both the polarizing film and the protective film. The adhesive layer may be formed on both the surfaces or one surface of the polarizing film or the protective film. The forming method of the adhesive layer is not particularly limited, and for example, the forming method is preferably performed by the application or dropping of an adhesive composition. In the case of the application, the method is appropriately selected according to the viscosity of the adhesive composition and the thickness of the objective adhesive layer. Specific examples thereof include a reverse coater, a gravure coater (direct, reverse or offset), a bar reverse coater, a roll coater, a die coater, a bar coater, and a rod coater. In addition, a dipping system or the like can be appropriately used for coating.

The step of bonding the protective film to the polarizing film is performed with the adhesive layer interposed therebetween. At this time, the protective film may be bonded to one surface or both the surfaces of the polarizing film. However, it is necessary to bond the protective film having a water-vapor permeability of 100 g/m²·day or less to at least one surface of the polarizing film.

The bonding method is not particularly limited, and examples thereof include a dry laminating method using a roll laminator. The dry laminating method is preferable in view of good adhering strength. In addition, the dry laminating method is capable of suppressing a situation in which a solvent component is left in the obtained polarizing plate, or the left solvent is blocked by the protective film during drying and the solvent cannot be removed from the polarizing plate, so that the solvent causes hue change and deterioration in polarization properties caused by the adverse effect due to the phenomena on the polarizing film. The adhesive composition is preferably used in a solventless or low-solvent (solvent content rate: 5% by weight or less) state so that the adhesive composition is suitable for the dry laminating method. In the dry laminating method, the solvent content rate of the adhesive composition when the protective film is bonded to the polarizing film is preferably 5% by weight or less, and more preferably 2% by weight or less.

The temperature for bonding the protective film to the polarizing film is preferably 15 to 30° C., and more preferably 20 to 25° C.

The moisture percentage immediately after the protective film is bonded to the polarizing film is 1 to 5% by weight, preferably 2 to 4% by weight, and more preferably 2.5 to 3% by weight. A moisture percentage of less than 1% by weight may cause deterioration in the durability of the polarizing plate in humidifying. A moisture percentage of more than 5% by weight may cause deterioration in the durability of the polarizing plate in heating.

The polarizing film to which the protective film is bonded is dried in order to evaporate moisture or the solvent contained in the coating layer and cure the adhesive composition to form the adhesive layer when the adhesive composition is an aqueous or solvent type adhesive composition. The polarizing film is dried in order to cure the adhesive composition to form the adhesive layer when the adhesive composition is a solventless type adhesive composition.

The drying temperature is in the range where a maximum temperature is 85° C. or higher, and preferably in the range where a maximum temperature is 85 to 95° C. By setting the maximum temperature during drying to 85° C. or higher, the adhesive layer can be sufficiently dried even in the polarizing plate of the present embodiment using the protective film having a low water-vapor permeability, which can prevent deterioration in the cross property of the polarizing film. A maximum temperature of less than 85° C. during drying causes insufficient evaporation of the moisture or solvent in the coating layer. This causes the hue change of the polarizing plate and the deterioration in the cross property thereof.

The drying method is not particularly limited as long as the maximum temperature during drying is in the above numerical value range, and the drying may be performed at a constant temperature of 85° C. or higher in a drier. The drying may be performed with a temperature gradient including a portion in which the maximum temperature is 85° C. or higher while the drying temperature is stepwise changed at every predetermined time. The heat-treating means for drying is not particularly limited, and for example, methods using a hot plate, an oven, a belt furnace or the like are appropriately employed. The drying may be performed by blowing hot wind with the methods.

The moisture percentage of the polarizing plate immediately after drying is set to 1 to 5% by weight, and preferably 2 to 4% by weight. A moisture percentage of less than 1% by weight may cause deterioration in the durability of the polarizing plate in humidifying. A moisture percentage of more than 5% by weight may cause deterioration in the durability of the polarizing plate in heating.

The drying is preferably performed until the moisture percentage of the polarizing plate immediately after drying is set to be in the above range. More specifically, the time period for maintaining the maximum temperature is preferably 2 to 40 minutes, and more preferably 5 to 25 minutes. When the drying time period is less than 2 minutes, the moisture or the solvent in the coating layer is not sufficiently evaporated, which may cause the hue change of the polarizing plate and the deterioration in the polarization properties thereof. In contrast, when the drying time period is more than 40 minutes, the polarizing film may be deteriorated by excessive drying.

By performing the above steps, the polarizing plate according to the present embodiment can be produced. The method for measuring absorbance will be described in detail in Examples.

EXAMPLES

Preferred examples of the present invention will be illustratively described in detail below. Unless otherwise stated, materials, contents and the like described in the examples are not intended to limit the scope of the invention in any way and are intended for illustration purposes only.

Example 1

<Polarizing Film>

A 45-μm-thick polyvinyl alcohol film having an average degree of polymerization of about 2,400 and a degree of saponification of 99.9% by mole or more ("VF-PS-A#4500" (trade name) manufactured by Kuraray Co., Ltd.) was immersed in warm water at 30° C. so that it was allowed to swell. The film was then immersed in an aqueous solution having an iodine/potassium iodide (weight ratio: 0.5/8) concentration of 0.3% by weight, and dyed while stretched to 3.5 times. Furthermore, the film was immersed in an aqueous boric ester solution at 65° C., and stretched to a total stretch ratio of 6 times in the aqueous boric ester solution. After the stretching, the film was dried in an oven at 40° C. for 3 minutes to produce a polarizing film (thickness: 27 μm, moisture percentage: 25% by weight, potassium content: 0.78% by weight, single transmittance: 42.7%).

<Protective Film (Low Water-Vapor Permeable)>

An MS resin (MS-200; copolymer of methyl methacrylate/styrene (molar ratio) of 80/20, manufactured by Nippon Steel Chemical Co., Ltd.) was imidized with monomethylamine (imidization ratio: 5%). The obtained imidized MS resin had a glutarimide unit represented by the general formula (1) (wherein $R^1$ and $R^3$ represent a methyl group and $R^2$ represents a hydrogen atom), a (meth)acrylic ester unit represented by the general formula (2) ($R^4$ represents a hydrogen atom, and $R^5$ and R represent a methyl group), and a styrene unit. An intermeshing co-rotating type twin-screw extruder having a bore diameter of 15 mm was used for imidization. The temperature of temperature control zones of the extruder was set to 230° C. The screw rotation speed was set to 150 rpm. The MS resin was fed to the extruder at a feed rate of 2.0 kg/hr. The amount of monomethylamine fed was 2 parts by weight relative to the MS resin. The MS resin was fed through a hopper of the extruder, and was melted in a kneading block of the extruder such that the kneading block was sufficiently charged with the resin thus melted. Thereafter, monomethylamine was injected through a nozzle of the extruder. A seal ring was placed in an end of the reaction zone such that the reaction zone was sufficiently charged with the resin. After the reaction, a by-product and an excess of methylamine were volatilized while the pressure exerted on a vent of the extruder was reduced to −0.08 MPa. The resin was extruded in a strand form through a die provided at an exit of the extruder. The resin thus extruded was cooled down in a water tank, and then was pelletized by a pelletizer. The imidized MS resin was melted and extruded to form a film. Then, the film was biaxially stretched to 2 times in a longitudinal direction and 2 times in a lateral direction to produce an acrylic resin film containing a glutarimide unit (thickness: 40 μm, Re: 2 nm, Rth: 2 nm, water-vapor permeability: 60 g/m²·day).

<Protective Film>

A triacetyl cellulose film having a thickness of 60 μm and a water-vapor permeability of 500 g/m²·day ("TD60UL" manufactured by Fuji Photo Film Co., Ltd.) was used as a protective film which can be combined with a low water-vapor permeable protective film.

<Preparation of Adhesive>

In pure water (water temperature: 30° C.) were dissolved 100 parts by weight of a polyvinyl alcohol-based resin having an acetoacetyl group (average degree of polymerization: 1,200, degree of saponification: 98.5%, degree of acetoacetylation: 5% by mole) and 50 parts by weight of methylol melamine to produce an aqueous solution having a solid content concentration of 3.7% by weight. To 100 parts by weight of the resultant aqueous solution, 18 parts by weight of an aqueous alumina colloid solution (average particle diameter: 15 nm, solid content concentration: 10% by weight, positive charge) was added to prepare an aqueous adhesive composition solution. The viscosity of the aqueous adhesive composition solution measured using Rheometer: RS-1 (manufactured by Heake) was 9.6 mPa·s. The pH of the aqueous adhesive composition solution was 4 to 4.5.

<Production of Polarizing Plate>

The surface treatment layer of the triacetyl cellulose film was coated with the aqueous adhesive composition solution so that the thickness after drying would be 80 nm, to form an adhesive layer. The coating was performed at 23° C. after 30 minutes from the preparation of the aqueous adhesive composition solution. The acrylic resin film was similarly coated with an aqueous adhesive composition solution, to form an adhesive layer.

Next, by using a roll machine, the triacetyl cellulose film was bonded to the surface of the polarizing film with the adhesive layer interposed therebetween, and the acrylic resin film was bonded to the back surface of the polarizing film with the adhesive layer interposed therebetween. The bonding temperature was set to 23° C.

Then, the polarizing film obtained by bonding the triacetyl cellulose film and the acrylic resin film thereto was dried. As the drying conditions, the drying temperature was set to 85° C. (constant), and the drying time was set to 10 minutes. Thereby, a polarizing plate according to the present example was produced.

Example 2

A polarizing plate according to the present example was produced in the same manner as in the above Example 1 except that the drying temperature was changed to 90° C., and the drying time was changed to 10 minutes in the drying conditions after a triacetyl cellulose film and an acrylic resin film were bonded to a polarizing film.

Example 3

A polarizing plate according to the present example was produced in the same manner as in the above Example 2 except that an acrylic resin film as a protective film was used for both surfaces.

Comparative Example 1

A polarizing plate according to the present comparative example was produced in the same manner as in the above Example 1 except that a triacetyl cellulose film as a protective film was used for both surfaces.

Comparative Example 2

A polarizing plate according to the present comparative example was produced in the same manner as in the above Example 1 except that a polyvinyl alcohol film having an average degree of polymerization of about 2,400, a degree of saponification of 99.4% by mole, and a thickness of 45 μm ("VF-PE-N#4500" (trade name) manufactured by Kuraray Co., Ltd.) was used as a polyvinyl alcohol film for forming a polarizing film.

Comparative Example 3

A polarizing plate according to the present comparative example was produced in the same manner as in the above Example 3 except that a polyvinyl alcohol film having an average degree of polymerization of about 2,400, a degree of saponification of 99.4% by mole, and a thickness of 45 μm ("VF-PE-N#4500" (trade name) manufactured by Kuraray Co., Ltd.) was used as a polyvinyl alcohol film for forming a polarizing film.

Comparative Example 4

A polarizing plate according to the present comparative example was produced in the same manner as in the above Comparative Example 1 except that a polyvinyl alcohol film having an average degree of polymerization of about 2,400, a degree of saponification of 99.4% by mole, and a thickness of 45 μm ("VF-PE-N#4500" (trade name) manufactured by Kuraray Co., Ltd.) was used as a polyvinyl alcohol film for forming a polarizing film.

Comparative Example 5

A polarizing plate according to the present comparative example was produced in the same manner as in the above Example 3 except that: a polyvinyl alcohol film having an average degree of polymerization of about 2,400, a degree of saponification of 99.4% by mole, and a thickness of 45 μm ("VF-PE-N#4500" (trade name) manufactured by Kuraray Co., Ltd.) was used as a polyvinyl alcohol film for forming a polarizing film; the drying temperature was set to 80° C.; and the drying time was set to 10 minutes.

Comparative Example 6

A polarizing plate according to the present comparative example was produced in the same manner as in the above Example 3 except that the drying temperature was set to 80° C., and the drying time was set to 10 minutes.

(Water-Vapor Permeability of Protective Film)

The water-vapor permeability of the protective film was measured using the water-vapor permeability test (cup method) according to JIS Z 0208. A cut piece sample having a diameter of 60 mm was placed in a water-vapor permeable cup to which about 15 g of calcium chloride had been added. The cup was then placed in a thermostatic chamber at a temperature of 40° C. and a humidity of 90%. The weight of the calcium chloride was measured before and after the storage for 24 hours, and the increase in the weight of the calcium chloride was determined and used to calculate the water-vapor permeability (g/m²·day).

(Measurement of Absorbance, Calculation of Absorbance Ratio)

The polarizing plate produced in each example and comparative example was immersed in a methylene chloride solution to dissolve the protective film, and each polarizing film was then extracted. Furthermore, absorbances at 285 nm and 480 nm were measured using a spectral photometer (U-4100 type spectral photometer (product name) manufactured by Hitachi, Ltd.), and an absorbance ratio ($I_{285}/I_{430}$) was obtained from these values.

(Polarization Properties of Polarizing Film)

A square-shaped sample of 4 cm×4 cm was obtained in parallel with the orientation direction of the polarizing film obtained in each of examples and comparative examples from the center in the width direction of the polarizing film. The single transmittance Ts, degree of polarization P, and cross transmittance (430 nm) of the sample were obtained by using an integrating sphere type spectrophotometer ("V7100" manufactured by JASCO Corporation).

(Hue of Polarizing Plate)

A square-shaped sample of 4 cm×4 cm was obtained in parallel with the orientation direction of the polarizing film obtained in each of examples and comparative examples from the center in the width direction of the polarizing plate. A b value based on a hunter Lab color system was obtained for use as an index of hue evaluation by using an integrating sphere type spectrophotometer ("V7100" manufactured by JASCO Corporation). As the b value is closer to 0, the polarizing plate is evaluated to have higher neutral property and better hue.

(Evaluation of Display Unevenness of Panel)

A liquid crystal panel was produced according to the following procedure, and display unevenness of the produced liquid crystal panel was evaluated in a humidified heat environment.

<Mounting of Polarizing Plate on Panel>

A liquid crystal panel was extracted from a liquid crystal display device including a liquid crystal cell which operated in an IPS mode (a liquid crystal panel (screen size: 32 inches) of liquid crystal television, model: 32LE7500 manufactured by LG Display Co., Ltd.). All optical films disposed above and below the liquid crystal cell were removed, to clean glass surfaces (back and front surfaces) of the liquid crystal cell. The liquid crystal cell thus produced was defined as a liquid crystal cell A. The produced polarizing plate described in each example and comparative example was bonded to both surfaces of the liquid crystal cell A with an acrylic pressure-sensitive adhesive (thickness: 20 μm) interposed therebetween so that an absorption axis of the polarizer was located in a long side direction on a visible side and an absorption axis of the polarizer was located in a short side direction on a back light side, to produce a liquid crystal panel A.

<Measurement of Display Unevenness of Panel>

The display unevenness of the liquid crystal panel A after placed for 120 hours in a 90% environment at 60° C. was measured. The liquid crystal panel A was lighted for 1 hour after 2 hours from the extraction thereof in a 55% environment at 23° C. The occurrence of the display unevenness was visually confirmed. A panel having no unevenness was evaluated as "good," and a panel having the unevenness was evaluated as "poor."

TABLE 1

|  | Visible side film | | Cell side film | | | Drying |
| --- | --- | --- | --- | --- | --- | --- |
|  | Film | Water-vapor permeability | Film | Water-vapor permeability | PVA film | temperature [° C.] |
| Example 1 | Acrylic (40) | 60 | TAC (60) | 500 | PS4500 | 85 |
| Example 2 | Acrylic (40) | 60 | TAC (60) | 500 | PS4500 | 90 |
| Example 3 | Acrylic (40) | 60 | Acrylic (40) | 60 | PS4500 | 90 |
| Comparative Example 1 | TAC (60) | 500 | TAC (60) | 500 | PS4500 | 85 |
| Comparative Example 2 | Acrylic (40) | 60 | TAC (60) | 500 | PE4500 | 85 |
| Comparative Example 3 | Acrylic (40) | 60 | Acrylic (40) | 60 | PE4500 | 90 |
| Comparative Example 4 | TAC (60) | 500 | TAC (60) | 500 | PE4500 | 85 |
| Comparative Example 5 | Acrylic (40) | 60 | Acrylic (40) | 60 | PE4500 | 80 |
| Comparative Example 6 | Acrylic (40) | 60 | Acrylic (40) | 60 | PS4500 | 80 |

|  | Absorbance [—] | | | Single trans- mittance [%] | Hue b value | Cross trans- mittance (430 nm) [%] | Display uneven- ness |
| --- | --- | --- | --- | --- | --- | --- | --- |
|  | 285 nm | 480 nm | Ratio (285/480) |  |  |  |  |
| Example 1 | 0.38 | 0.33 | 1.1 | 42.7 | 3.5 | 0.007 | good |
| Example 2 | 0.41 | 0.33 | 1.2 | 42.7 | 4.0 | 0.005 | good |
| Example 3 | 0.40 | 0.33 | 1.2 | 42.7 | 4.0 | 0.01 | good |
| Comparative Example 1 | 0.37 | 0.33 | 1.1 | 42.7 | 4.0 | 0.007 | poor |
| Comparative Example 2 | 0.43 | 0.33 | 1.3 | 42.7 | 4.2 | 0.007 | good |
| Comparative Example 3 | 0.43 | 0.33 | 1.3 | 42.7 | 4.5 | 0.01 | good |

TABLE 1-continued

| | | | | | | | |
|---|---|---|---|---|---|---|---|
| Comparative Example 4 | 0.43 | 0.33 | 1.3 | 42.7 | 4.5 | 0.007 | poor |
| Comparative Example 5 | 0.38 | 0.39 | 1.0 | 42.7 | 3.0 | 0.02 | good |
| Comparative Example 6 | 0.35 | 0.39 | 0.9 | 42.7 | 3.0 | 0.02 | good |

In the table, acrylic, TAC, and PVA respectively mean a glutarimide unit-containing acrylic resin film, a triacetyl cellulose film, and polyvinyl alcohol.
The unit of water-vapor permeability is g/m² · day.

(Results)

As seen from Table 1, it was found that the polarizing plate according to each of Examples 1 to 3 had a low hue b value and neutral hue. The polarizing plate showed also good evaluation results of the cross property and display unevenness. Since the high water-vapor permeable triacetyl cellulose film was provided on each surface of the polarizing film in Comparative Example 1, the display unevenness occurred in a humidified heat environment. Since the absorbance ratio was more than 1.2 in Comparative Examples 2 and 3, the hue b value was high, and the neutral hue was not achieved. Since the high water-vapor permeable triacetyl cellulose film was provided on each surface of the polarizing film and the absorbance ratio was more than 1.2 in Comparative Example 4, the results of both the hue b value and the display unevenness were poor. Since the cross transmittance was increased and the absorbance ratio was 1.0 or less although the display unevenness was suppressed in Comparative Examples 5 and 6, deep bluish color was observed, which caused deterioration in the neutral property of hue.

What is claimed is:

1. A polarizing plate comprising:
   a polarizing film;
   an adhesive layer; and
   a protective film provided on at least one surface of the polarizing film with the adhesive layer interposed therebetween,
   wherein:
   a ratio ($I_{285}/I_{480}$) of absorbance $I_{285}$ of the polarizing film at 285 nm to absorbance $I_{480}$ thereof at 480 nm is 1.2 or less;
   the polarizing plate has a hue b value of 4 or less; and
   the protective film has a water-vapor permeability of 100 g/m²·day or less.

2. The polarizing plate according to claim 1, wherein the ratio ($I_{285}/I_{480}$) is more than 1.0 and less than or equal to 1.2.

3. The polarizing plate according to claim 1, wherein the adhesive layer contains a water-based adhesive.

4. The polarizing plate according to claim 1, wherein the protective film contains a (meth)acrylic resin which has an unsaturated carboxylic acid alkyl ester unit and a glutarimide unit represented by the general formula (1), has an imidization ratio of 2.5 to 5.0% and an acid value of 0.10 to 0.50 mmol/g, and contains less than 1% by weight of an acrylic ester unit:

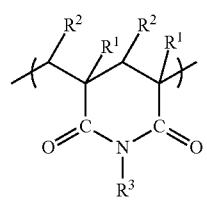

general formula (1)

wherein
$R^1$ and $R^2$ each independently represent hydrogen or an alkyl group having 1 to 8 carbon atoms; and
$R^3$ represents an alkyl group having 1 to 18 carbon atoms, a cycloalkyl group having 3 to 12 carbon atoms, or an aryl group having 6 to 10 carbon atoms.

5. The polarizing plate according to claim 1, wherein the protective film contains an ultraviolet-ray absorber.

6. The polarizing plate according to claim 1, wherein the polarizing film has a single transmittance of 42 to 44%.

7. The polarizing plate according to claim 1, wherein the water-vapor permeability is 1 to 80 g/m²·day.

8. A method for manufacturing a polarizing plate,
   the polarizing plate comprising a polarizing film and a protective film provided on at least one surface of the polarizing film,
   the method comprising the steps of:
   forming an adhesive layer on at least one of the polarizing film and the protective film;
   bonding the protective film to at least one surface of the polarizing film with the adhesive layer interposed therebetween; and
   heating the polarizing plate including the protective film and the polarizing film bonded together, in a temperature range of 85° C. or higher, to dry the polarizing plate,
   wherein:
   a ratio ($I_{285}/I_{480}$) of absorbance $I_{285}$ of the polarizing film at 285 nm to absorbance $I_{480}$ thereof at 480 nm is 1.2 or less; and
   the protective film has a water-vapor permeability of 100 g/m²·day or less.

9. The method for manufacturing a polarizing plate according to claim 8, wherein the ratio ($I_{285}/I_{480}$) is more than 1.0 and less than or equal to 1.2.

10. The method for manufacturing a polarizing plate according to claim 8, wherein the water-vapor permeability is 1 to 80 g/m²·day.

* * * * *